Patented May 13, 1941

2,241,982

UNITED STATES PATENT OFFICE 2,241,982

CONGELATION DEPRESSOR

Frank M. Clark, Pittsfield, Mass., assignor to General Electric Company, a corporation of New York No Drawing. Application April 19, 1940,
Serial No. 330,625

5 Claims. (Cl. 252—78)

The present application is a continuation-in-part of my prior application Serial No. 250,198, filed January 10, 1939. It relates to liquid compositions which are adapted for use as heat transfer agents, electric insulation, or other purposes, which entail exposure of such compositions to extremely low climatic temperatures.

In a prior United States Patent No. 2,169,872, patented August 15, 1939 by Frank M. Clark and Walter M. Kutz, there are enumerated a considerable number of liquid compositions of various chlorinated hydrocarbons which are subject to slow crystal formation and eventual congelation if exposed to low climatic temperatures for protracted periods. As also described in said application, the 1,2,3,4 and the 1,2,3,5 isomers of tetrachlorbenzene constitute effective inhibitors for reducing or entirely preventing such crystal formation.

The 1,2,4,5 isomer of tetrachlorbenzene is insoluble in amounts greater than a few per cent in trichlorbenzene and similar liquid chlorinated materials, and is harmful as a low temperature ingredient for liquid chlorinated hydrocarbons. Amounts of 1,2,4,5 isomer even as low as one per cent cause mixtures of chlor diphenyl and trichlorbenzene to congeal within a few hours at −25° C.

The action of the effective isomers of tetrachlorbenzene (1,2,3,4 and 1,2,3,5) in efficiently counteracting the tendency for partial or complete solidification of liquid chlorinated compounds at low temperatures is handicapped by the fact that such effective isomers, as produced under commercial conditions, are unavoidably associated with considerable amounts, say, from about one per cent to amounts as high as about 12 to 13 per cent of the undesirable 1,2,4,5 isomer. As no absolute limits can be set, these figures are to be considered approximate and illustrative. The removal of 1,2,4,5 isomer from such commercial products is difficult and expensive.

I have discovered that compositions of tetrachlorbenzene containing as impurity relatively considerable amounts of the 1,2,4,5 isomer can be rendered effective as inhibitors of crystallization by associating therewith a substantial amount of pentachlorbenzene. The latter compound should be present in the inhibitor in amounts depending on the content of 1,2,4,5 tetrachlorbenzene and the other conditions, such as the characteristics of the composition for which the inhibitor is to be used and the low temperatures to which such composition is to be subjected. The content of pentachlorbenzene ordinarily should be limited to 10 per cent of the combined tetrachlorbenzene isomers. Most favorably, the ratio of 1,2,4,5 tetrachlorbenzene to pentachlorbenzene should be about 1 to .6. Ordinarily the pentachlorbenzene should not be materially greater than the amount of the 1,2,4,5 isomer and should be equal to at least about 5 per cent of such isomer.

The following specific examples will illustrate the nature of my invention:

EXAMPLE 1

One form of commercial 1,2,3,4 tetrachlorbenzene composition contains the following ingredients by weight:

*Inhibitor A*

|  | Parts by weight |
|---|---|
| Tetrachlorbenzene (1,2,3,4) | 94 |
| Tetrachlorbenzene (1,2,4,5) | 6 |

The addition of this composition to mixtures of chlorinated diphenyl and trichlorbenzene while depressing the pour point or congealing temperature will not prevent crystal formation. Solidification at −25° C. will occur in one or two days.

The addition thereto of 1 to 2.5 per cent of pentachlorbenzene, forming Inhibitor $A^1$, is effective to cause crystallization to be reduced to a negligible amount. The addition thereto of 3.75 per cent of pentachlorbenzene, forming Inhibitor $A^2$, effectually eliminates the crystal-forming tendency of the 1,2,4,5 isomer.

When to a liquid heat-transfer composition consisting by weight of 45 parts of chlorinated diphenyl (60 per cent chlorine) and 40 parts of trichlorbenzene there were added 15 parts of Inhibitor $A^1$, the formation of crystals at −25° C. after eight days amounted to only 1 per cent.

Upon the addition of 15 parts by weight of Inhibitor $A^2$ to such mixture, no crystals were formed when the refrigeration period at −25° C. lasted four weeks or longer. The mixture remained clear and fluid.

EXAMPLE 2

In Example 1 the lowest ratio of pentachlorbenzene to 1,2,4,5 tetrachlorbenzene is one to six. In some cases when a larger proportion of said 1,2,4,5 isomer is present, the relative amount of pentachlorbenzene should not be so low. In the following composition the ratio of pentachlorbenzene to the 1,2,4,5 isomer is ordinarily not wholly adequate, although equal to 1 to 6.5.

*Inhibitor B*

|  | Parts by weight |
|---|---|
| Tetrachlorbenzene (1,2,3,4) | 85 |
| Tetrachlorbenzene (1,2,4,5) | 13 |
| Pentachlorbenzene | 2 |

When the amount of pentachlorbenzene is increased to 6.5 parts, forming Inhibitor B¹, the crystal formation is effectually prevented. The following composition will remain liquid indefinitely at —25° C.:

| | Parts |
|---|---|
| Chlorinated diphenyl (60% chlorine) | 45 |
| Chlorinated benzene | 40 |
| Inhibitor B¹ | 15 |

Inhibitor B¹ stated in another form has the following composition:

| | Parts by weight |
|---|---|
| Tetrachlorbenzene (1,2,3,4) | 81.1 |
| Tetrachlorbenzene (1,2,4,5) | 12.4 |
| Pentachlorbenzene | 6.5 |

Other inhibitor compositions, in which ratios of pentachlorbenzene differ widely, illustrative of my invention are the following Examples 3 and 4:

EXAMPLE 3

| | Parts by weight |
|---|---|
| Tetrachlorbenzene (1,2,3,4) | 85.0 |
| Tetrachlorbenzene (1,2,4,5) | 8.5 |
| Pentachlorbenzene | 6.5 |

EXAMPLE 4

The following inhibitor mixture contains a relatively small amount of the 1,2,4,5 isomer:

| | Parts by weight |
|---|---|
| Tetrachlorbenzene (1,2,3,4) | 13.5 |
| Tetrachlorbenzene (1,2,4,5) | 1.0 |
| Pentachlorbenzene | .5 |

An inhibitor prepared in accordance with Examples 3 and 4 when added to commercial compositions of chlorinated diphenyl and trichlorbenzene caused them to remain liquid indefinitely at —25° C.

In some instances when less severe conditions are encountered, the amount of pentachlorbenzene may be as low as about 5 per cent of the 1,2,4,5 isomer.

EXAMPLE 5

| | Parts by weight |
|---|---|
| Tetrachlorbenzene (1,2,3,4) | 92 |
| Tetrachlorbenzene (1,2,4,5) | 7.6 |
| Pentachlorbenzene | .4 |

Although the above illustrations of compositions, of which inhibitors embodying the present invention form a part, include in each case chlorinated diphenyl and trichlorbenzene, the inhibitors may be used with various other liquid halogenated materials, such as described, for example, in prior Patent No. 2,169,872 in connection with inhibitors of this general class.

What I claim as new and desire to secure by Letters Patent of the United States is:

1. An inhibitor for crystal formation at low temperatures for use in chlorinated aromatic hydrocarbons consisting of a mixture of isomers of tetrachlorbenzene which includes about 1 to 13 per cent of 1,2,4,5 isomer and a quantity up to 10 per cent of pentachlorbenzene not exceeding the quantity of 1,2,4,5 isomer and equal at least to about one-half of said 1,2,4,5 isomer.

2. A liquid composition comprising essentially chlorinated diphenyl of 60 per cent chlorine content, trichlorbenzene and an inhibitor of crystallization consisting of 1,2,3,4 isomer of tetrachlorbenzene, 1,2,4,5 isomer of tetrachlorbenzene and pentachlorbenzene, the latter ingredient amounting to less than 10 per cent of said tetrachlorbenzene isomers combined and being equal to at least about 5 per cent of said 1,2,4,5 isomer.

3. A congelation inhibitor comprising a mixture of isomers of tetrachlorbenzene which includes about 1 to 13 per cent of 1,2,4,5 isomer and a substantial amount up to about 10 per cent of pentachlorbenzene, the latter ingredient being equal to at least 5 per cent of the 1,2,4,5 isomer.

4. A congelation inhibitor consisting essentially of tetrachlorbenzene and pentachlorbenzene, the tetrachlorbenzene ingredient including about 1 to 12 per cent of the 1,2,4,5 isomer and the ratio of said isomer to the pentachlorbenzene ingredient being about 1 to .6, the total amount of pentachlorbenzene being less than about 10 per cent of the total amount of tetrachlorbenzene.

5. A liquid composition comprising about 45 parts by weight of chlorinated diphenyl, about 40 parts of trichlorbenzene, and about 15 parts by weight combined of tetrachlorbenzene isomers and pentachlorbenzene, the tetrachlorbenzene isomers including about 1 to 13 per cent of 1,2,4,5 isomer and the pentachlorbenzene being less than 10 per cent of the combined weights of the tetrachlorbenzene isomers.

FRANK M. CLARK.